United States Patent [19]

Willot

[11] 4,200,442

[45] Apr. 29, 1980

[54] APPARATUS FOR NEUTRALIZING AND PURIFYING AIR

[75] Inventor: Henri A. Willot, Sart-Dames-Avelines, Belgium

[73] Assignee: Centre de Recherche Fondamentale "Rivieren" S.P.R.L., Brussels, Belgium

[21] Appl. No.: 856,951

[22] Filed: Dec. 2, 1977

[30] Foreign Application Priority Data

| | | | |
|---|---|---|---|
| Dec. 3, 1976 | [GB] | United Kingdom | 50617/76 |
| May 3, 1977 | [BE] | Belgium | 177240 |

[51] Int. Cl.[2] ...................... B01D 45/04; B01D 50/00; F25D 17/06

[52] U.S. Cl. ........................................ 55/222; 55/258; 55/260; 55/268; 55/269; 55/279; 55/315; 55/415; 55/418; 55/444; 55/463; 55/283; 55/DIG. 9; 62/91; 62/93; 62/156; 62/276

[58] Field of Search ................. 55/209, 210, 218, 219, 55/222, 258, 260, 265, 267-269, 279, 315, 316, 415, 418, 444, 385 A, 463, DIG. 9, 283; 21/74 R; 62/90-92, 95, 96, 93, 156, 276

[56] References Cited

U.S. PATENT DOCUMENTS

| | | | |
|---|---|---|---|
| 1,222,751 | 4/1917 | Frohrieb | 55/418 |
| 1,917,043 | 7/1933 | Lewis | 55/415 |
| 2,060,169 | 11/1936 | Bubar | 55/418 |
| 2,076,815 | 4/1937 | Fulweiler | 55/418 |
| 2,236,358 | 3/1941 | Allardice | 55/269 |
| 2,811,223 | 10/1957 | Newton | 62/92 |
| 3,818,718 | 6/1974 | Freese | 62/92 |

FOREIGN PATENT DOCUMENTS

| | | | |
|---|---|---|---|
| 969667 | 7/1949 | Fed. Rep. of Germany | 55/269 |
| 67341 | 1/1944 | Norway | 55/269 |
| 1083427 | 9/1967 | United Kingdom | 55/269 |

*Primary Examiner*—David L. Lacey

*Attorney, Agent, or Firm*—Sughrue, Rothwell, Mion, Zinn and Macpeak

[57] ABSTRACT

An apparatus for neutralizing and purifying air comprises an air filter, a preliminary drier, two alternately operable driers, a turbine for moving the air, a cooling unit, a heating unit, a moistening unit, at least one conditioner, and connecting means for outputting the treated air. The cooling unit lowers the temperature of the air, and comprises a separator for liquids and a separator for solids. The heating unit brings the temperature of the air back up to between 250° and 450° C.

21 Claims, 31 Drawing Figures

16
17
15
18
13
19

13
15
11
14
12

22
21
20
15
13
14
12
11

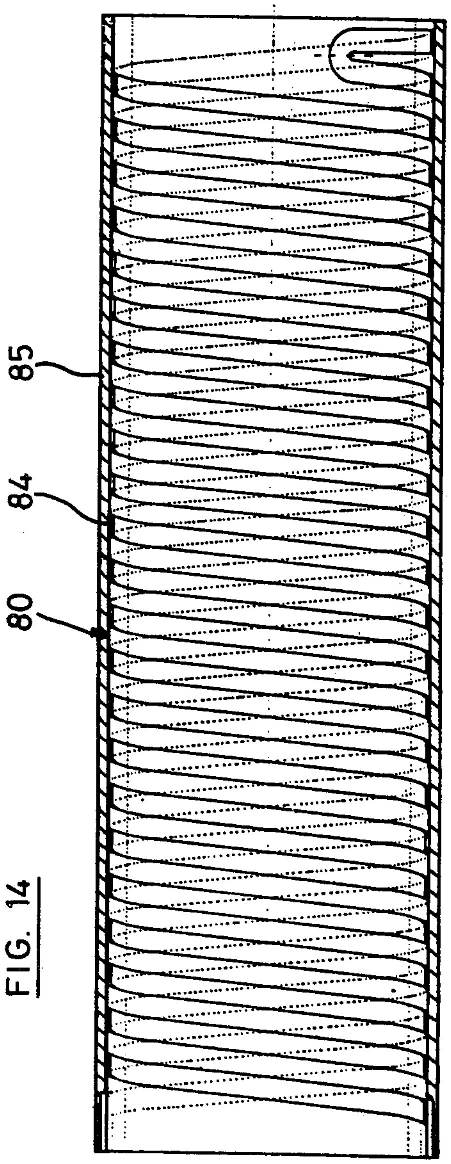
FIG. 14
FIG. 15
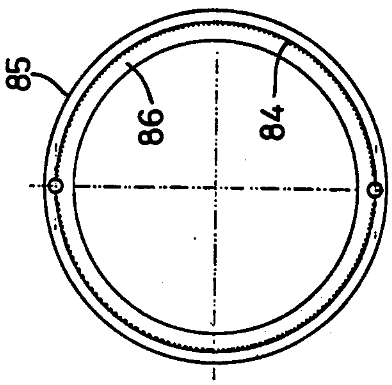

APPARATUS FOR NEUTRALIZING AND PURIFYING AIR

BACKGROUND OF THE INVENTION

The present invention relates to an apparatus for neutralizing and purifying air, and is specifically useful for hospitals.

The air of sick rooms and operating rooms contains materials of extrinsic origin, such as bacteria, virusses, and dust which are too small to be filtered, as well as harmful components in the gaseous or liquid state.

SUMMARY OF THE INVENTION

It is an object of the present invention to provide a new apparatus for neutralizing and purifying air, which is able to supply a stream of purified and possibly conditioned air and which may be used without danger in hospitals or in any other place requiring a particularly pure and controlled atmosphere.

Such apparatus comprises an air filter, a preliminary drier, two driers performing alternatingly, a turbine, an intensive cooling unit, possibly an intensive heating unit, possibly a moistening unit, possibly a conditioner, and output connecting means.

The air filter, preferably rotary one, removes particles having predetermined sizes.

The preliminary drier comprises a cooling tunnel through which the filtered air passes. The preliminary drier is provided with a refrigeration coil and with a plurality of deflectors to partially remove liquid particles and droplets existing or formed in the air to be treated by cooling them to their dew points.

The two driers each comprise a cooling tunnel through which the predried air is passed. The tunnel is first provided with another refrigeration coil and further with a plurality of deflectors to completely remove any liquid particles and droplets remaining in the predried air or formed during the subsequent cooling of said air to temperatures of −20° to −40° C. The tunnel is also provided with a defrosting system.

The turbine moves the air stream along its path through the whole circuit.

The cooling unit receiving the dried air comprises a first heat exchanger cooperating with a refrigeration unit to intensively cool the dry air, a separator for separating the droplets and particles of liquefied gas formed during the cooling of the dry air, a separator for separating any solid particles existing or formed during said cooling of air, such as microorganisms and virusses, and finally a second heat exchanger to reheat the dry treated air to about the inlet temperature to the first heat exchanger.

The heating device receiving the dry air leaving the cooling device comprises a heat exchanger cooperating with a heat source to abruptly heat the dry air to about 250° to 450° C., and another heat exchanger to abruptly cool it afterwards.

The moistening unit receiving the dry air leaving the heating unit comprises means for injecting distilled and demineralized water.

The conditioner receiving the moistened water comprises means for injecting at least one convenient additive.

In order to perform with the smallest dead-time, the filter of the apparatus is provided with a pressure regulator for controlling the loss of head therein.

According to a functional feature of the apparatus, the refrigeration machine of the preliminary drier is controlled by a thermostat in response to a thermal probe arranged at its outlet.

Each drier comprises inlet and outlet drop shutters, operated in synchronism by a driving part itself controlled by a servo-motor influenced in particular by the defrosting circuit of the active drier.

Each drier is further provided with a frost detector influencing a servo-motor which allows switching on the feed of the electrical resistances and which further ensures, after the defrosting, the return of the cooling circuit back to its normal cooling and waiting condition.

In order to ensure the removal of the water, the preliminary drier and each drier are provided with a collector for the water removed from the air, said collector extending into a conduct provided with a valve operated by a water-level detector.

In order to have a flexible and extensive working capacity, the turbine of the new apparatus is provided with a speed regulator.

The heat exchangers of the cooling unit are provided with inlet and outlet drop shutters, operated in synchronism by a driving part controlled by a regulation means influenced in particular by a thermal probe arranged upstream with respect to the turbine and a thermal probe inside said unit. The exchangers may further constitute an annular exchanger delimiting a central bore in which the separator for the liquid particles and the separator for the solid particles are arranged in an axial disposition.

Furthermore, the refrigeration machine of the cooling unit is controlled by a thermal probe inside said unit.

The separator for the liquid particles comprises a perforated tubular support including deflectors of a truncated cone shape, provided with a plurality of small holes for allowing the air to go through. These deflectors direct the retained liquid particles towards the support to lead them through the apertures of said support and collect them in an outer sleeve.

The separator for solid or solidified particles is further constituted by an enclosure comprising oblong deflecting and separating elements having a variable thickness and forming with respect to each other and with respect to the longitudinal walls of the enclosure, acceleration passages for the air-jets. These oblong elements have aspiration slits for the solid or solidified particles, in communication with an inner hole in which a suction effect can be created.

The oblong deflecting and separating elements in the separator of solid or solidified particles, preferably, each have the shape of a falling drop and are directed longitudinally with their tail generally directed to the backside. Furthermore, these oblong deflecting and separating elements have their slits on their lateral surfaces and at the tip of their tail.

In a first embodiment which is particularly suitable for medical purposes, the separator for solid or solidified particles comprises at its front side an oblong deflection element, narrowing to the back side, said element being placed between two oblong deflecting and separating elements, narrowing to the front side, in its middle portion an undulator with successive bulgings and at its back side a transverse series of oblong deflecting and separating elements, narrowing to the back side.

In a second embodiment, used in particular for industrial purposes, the separator for the solid or solidified particles comprises from the front to the back side a transverse series of oblong deflecting and separating elements narrowing to their back side.

The elements of the series are arranged in quincunx with respect to each other, the tails of the elements of one series being between the heads of the elements of the next series.

In a third embodiment used in particular for scientific purposes, the separator for the solid or solidified particles comprises a single pair of annular deflecting and separating elements, arranged in an appropriate cavity in its longitudinal wall. The front element tapers towards its front side. The two elements form with respect to each other and with respect to the longitudinal wall, acceleration passages in which end the aspiration slits which are provided in said elements and in said wall.

The annular heat exchanger of the heating unit has a central cavity in which is arranged a heat source in the form of a perforated heating tube. This exchanger comprises at least two parts arranged at each side of the heat source and having a cross section for the air stream which increases from the outside towards the axis and a cross section for the air stream which decreases from the outside towards the axis, one of said parts being used for the heating of the air and the other part for its subsequent cooling.

The apparatus is automatically controlled and supervised by microprocessor.

BRIEF DESCRIPTION OF THE DRAWINGS

FIG. 14 is an axial section of the refrigeration coil of the cooling unit.

FIG. 15 is a side view of the coil.

In these various figures like reference characters represent identical elements.

DETAILED DESCRIPTION OF THE PREFERRED EMBODIMENTS

Figure 1:
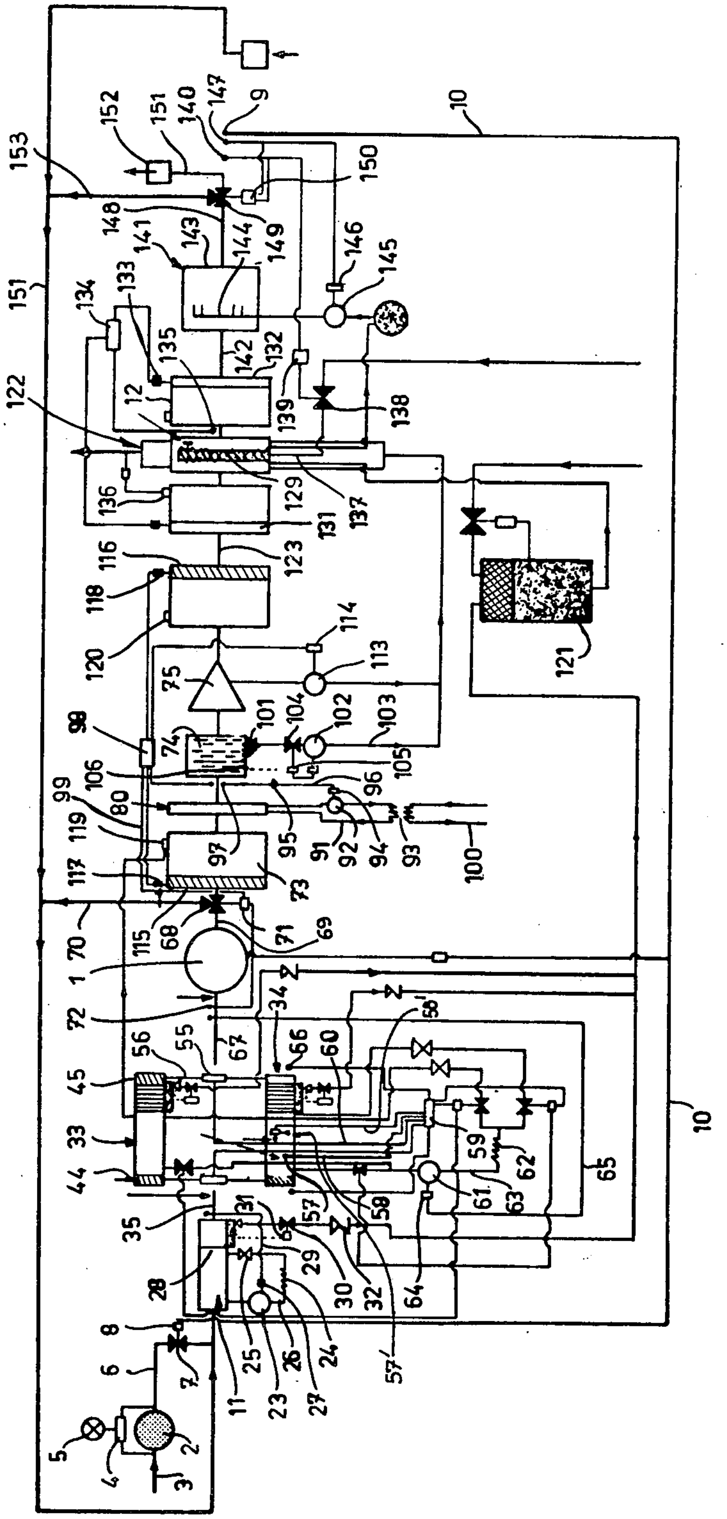
FIG. 1 is a general diagram of an apparatus for neutralizing and purifying air according to the invention.
Figures 2, 3, 4:
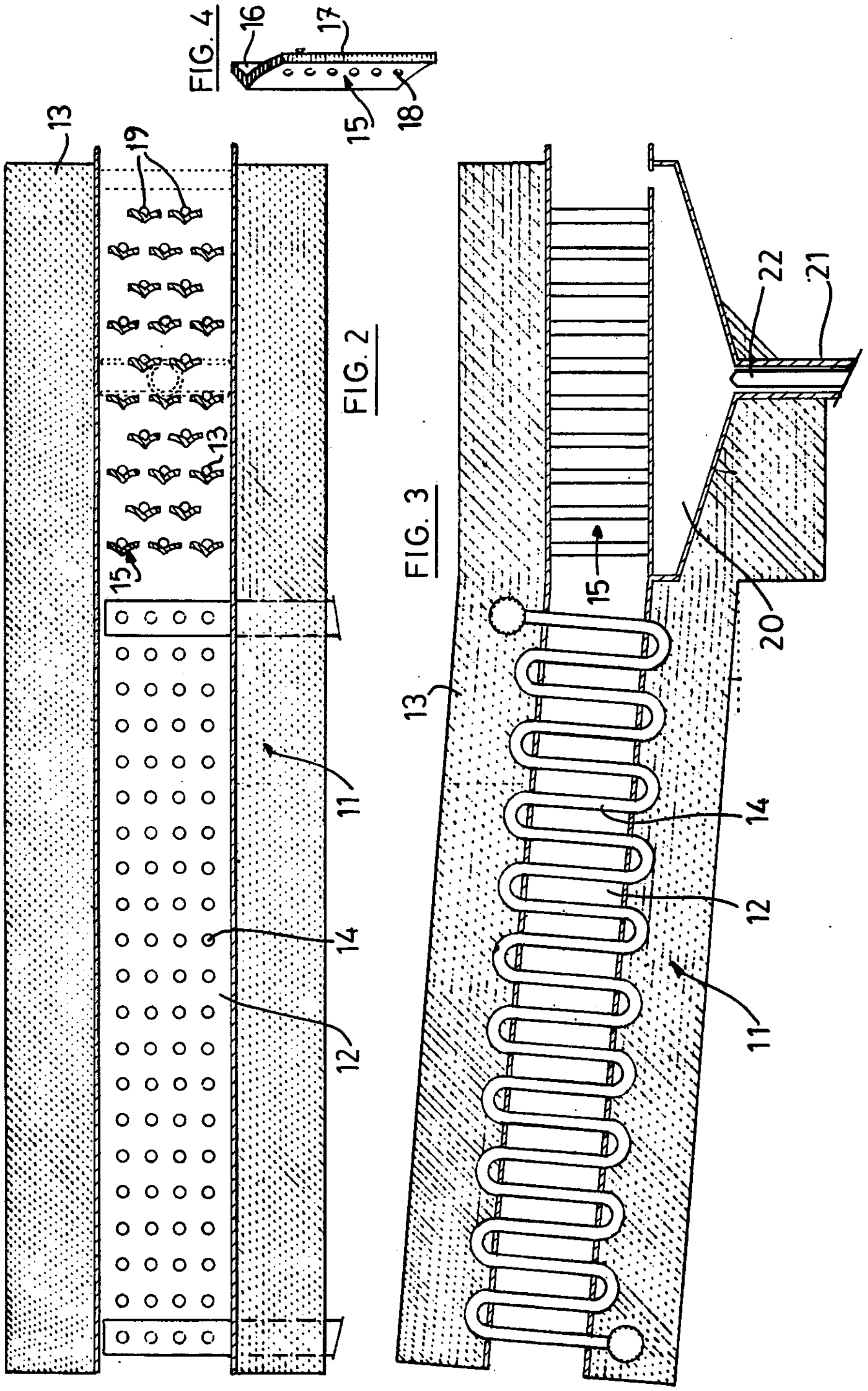
FIG. 2 is a view, partially in section of the preliminary drier of the apparatus.
FIG. 3 is a partial vertical section of the preliminary drier.
FIG. 4 is a view in perspective of a deflector of the preliminary drier.
Figure 5:
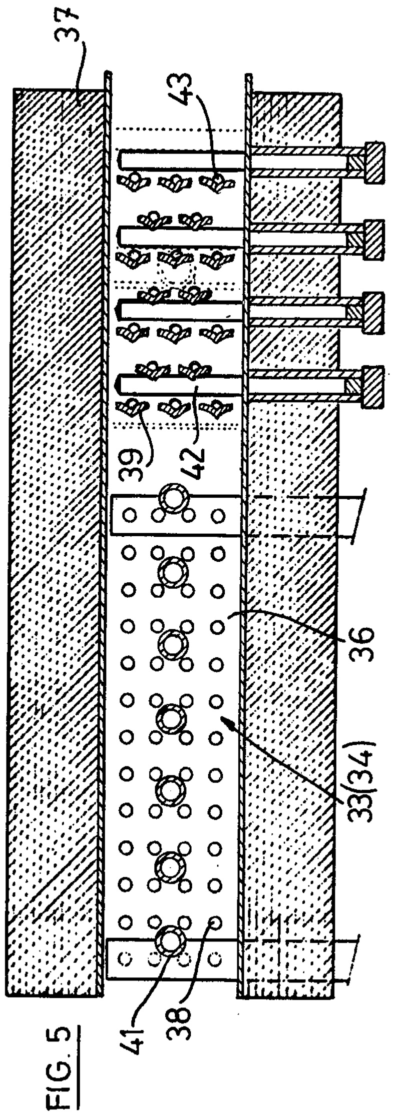
FIG. 5 is a partial horizontal section of a drier of the apparatus.
Figure 6:
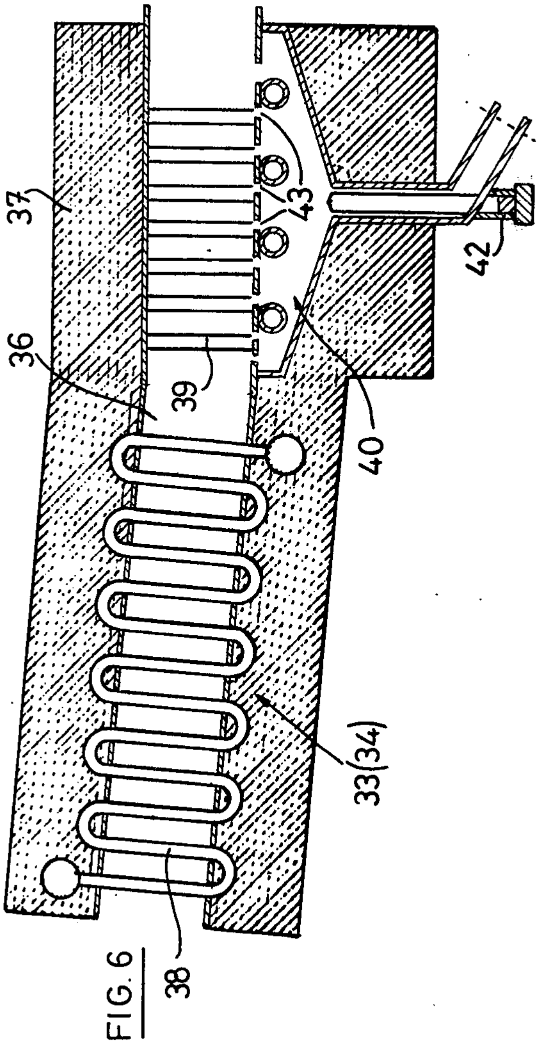
FIG. 6 is a partial vertical section of the drier.
Figure 8:
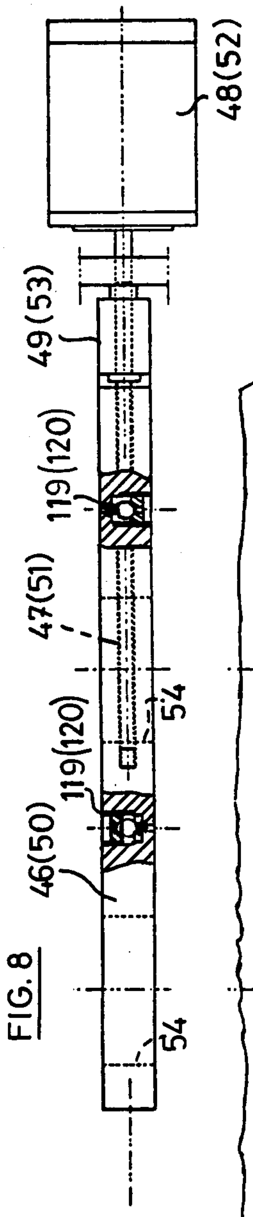
FIG. 8 is a partially sectioned side view of the drop shutter.
Figure 7:
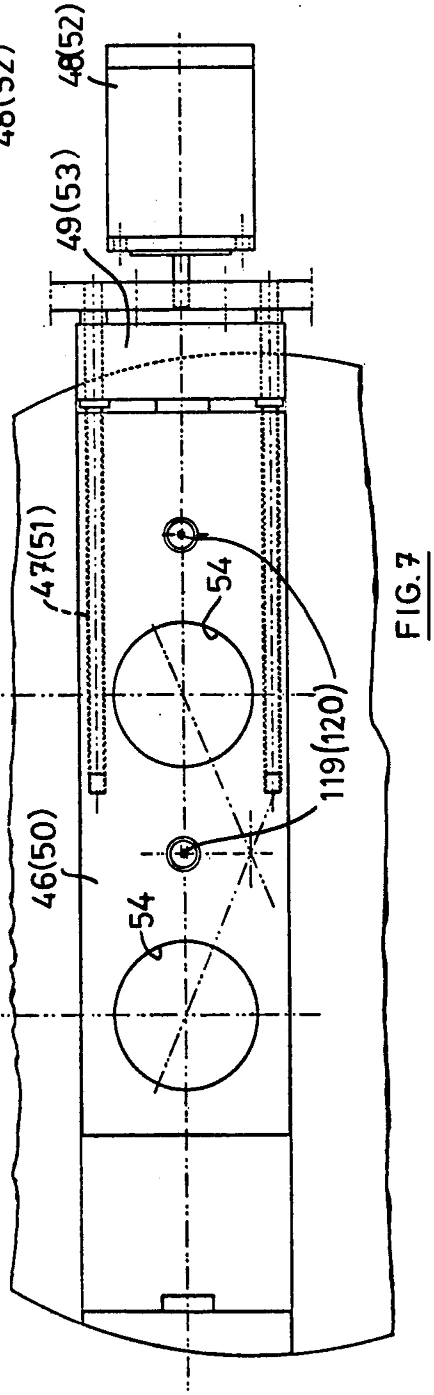
FIG. 7 is a front view in elevation of a drop shutter of the preliminary drier and the drier.
Figure 9:
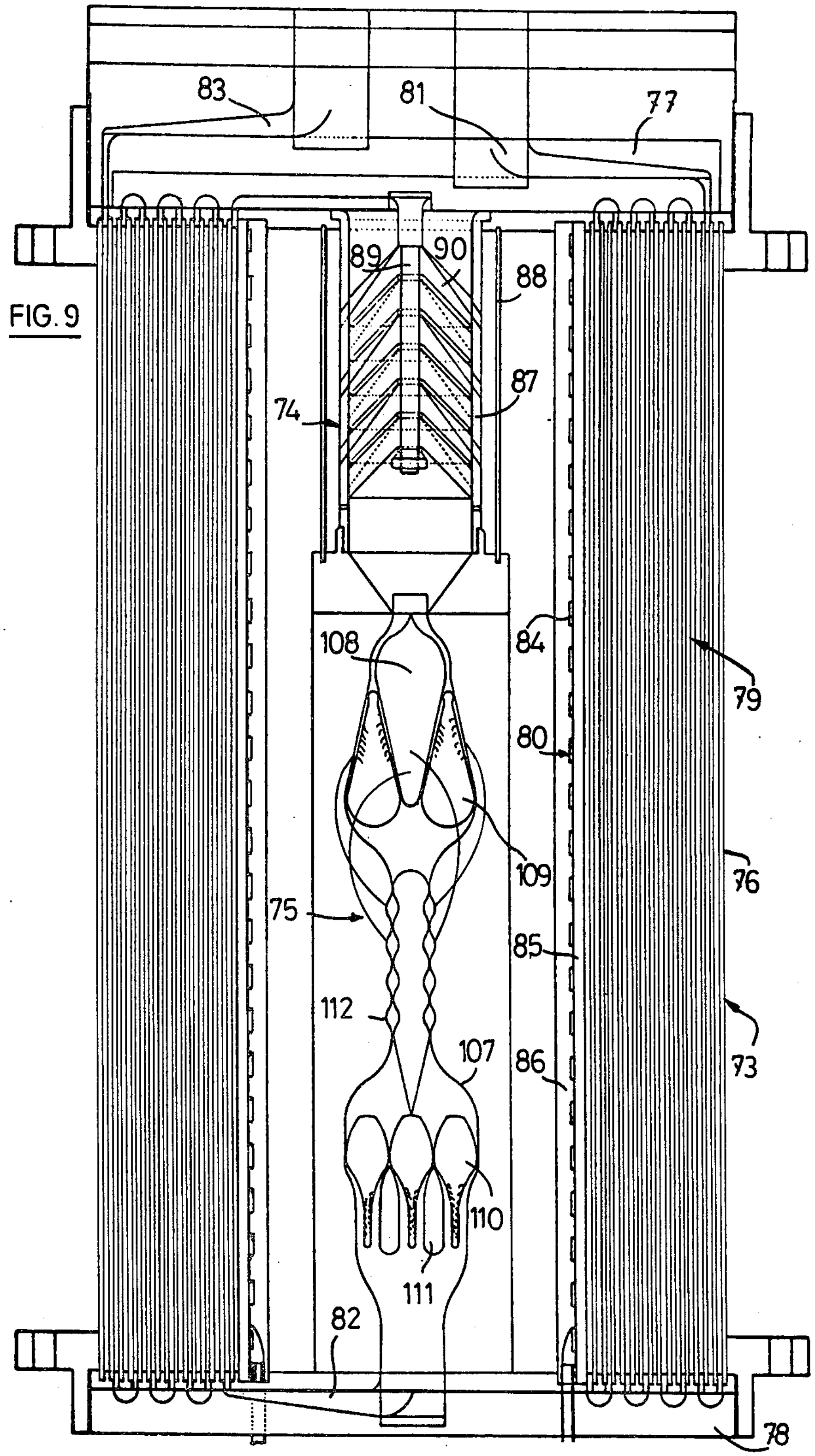
FIG. 9 is an axial section of the cooling unit of the apparatus.
Figure 10:
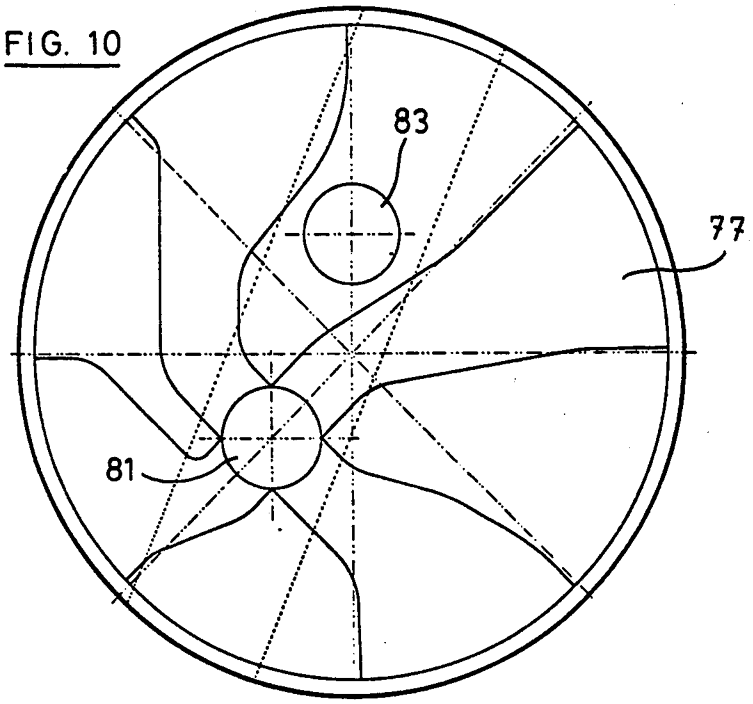
FIGS. 10, 11, 12 and 13 are views in elevation of the construction plates of the intensive cooling unit.
Figure 11:
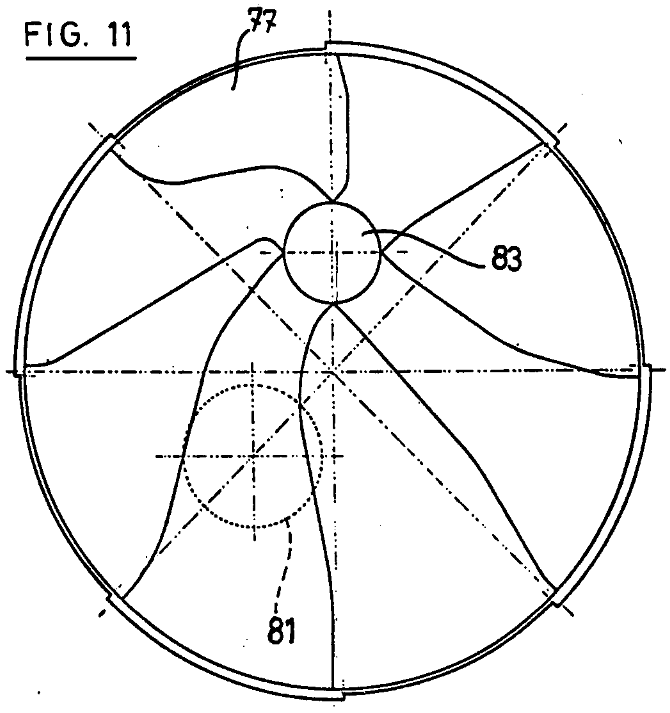
Figure 12:
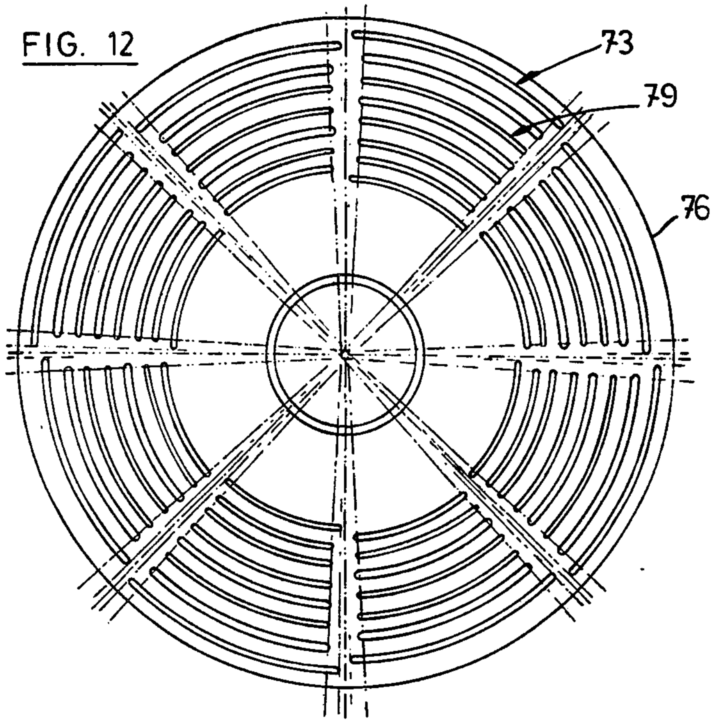
Figure 13:
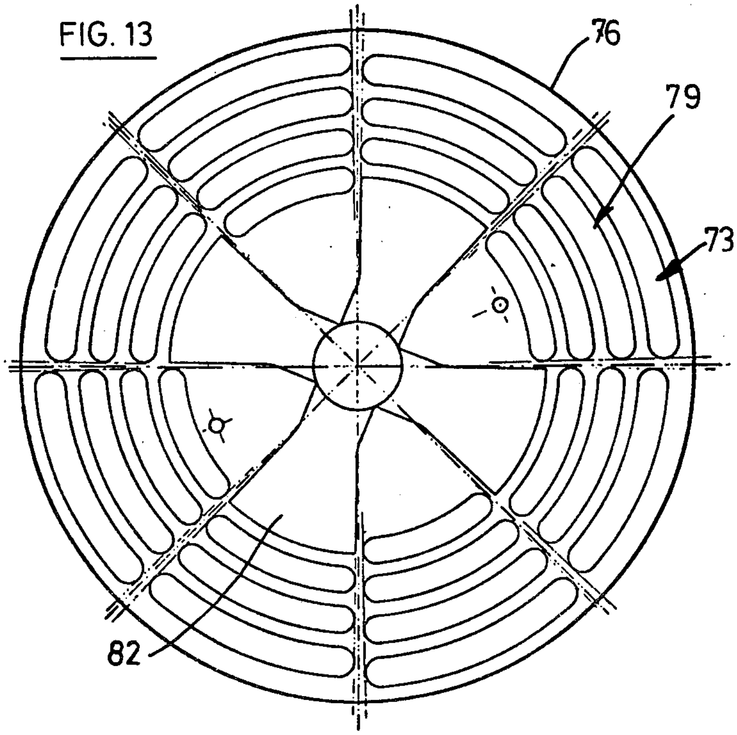
Figure 16:
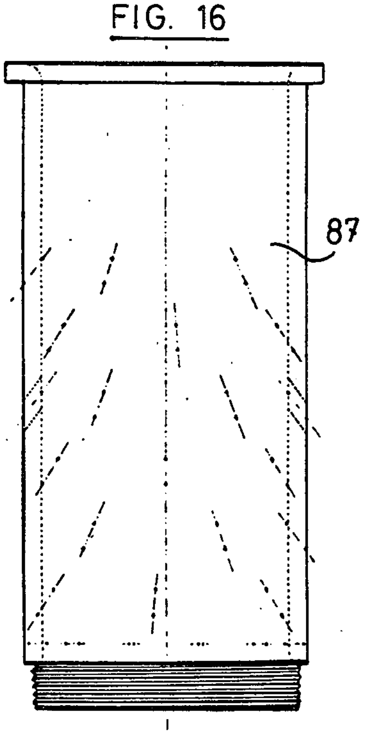
FIG. 16 is a view in elevation of the tubular support of the separator for liquid particles of the cooling unit.
Figure 17:
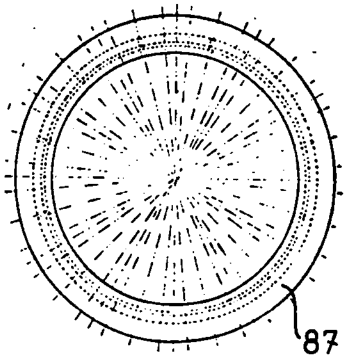
FIG. 17 is a side view of said tubular support.
Figure 18:
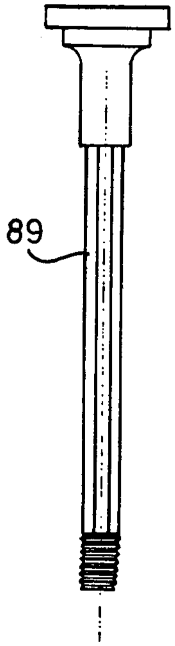
FIG. 18 represents the axial shaft of the separator of liquid particles.
Figure 19:
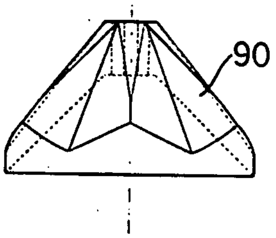
FIG. 19 is a view in elevation of a deflector with a truncated cone shape of the separator for the liquid particles.
Figure 20:
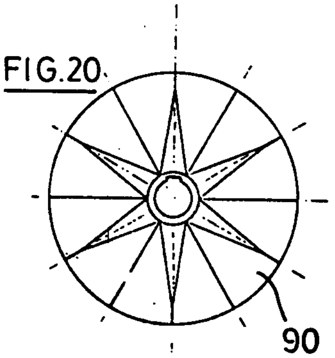
FIG. 20 is a plan view of said deflector with a truncated cone shape.

The disclosed apparatus is an air neutralizer intended to be used for medical purposes to deliver a continuous flow of dried, purified and conditioned air.

The air neutralizer essentially comprises an air circuit through which a predetermined air flow passes under the action of a turbine 1 having a speed regulator.

The air circuit first comprises a rotating air filter 2 for filtering air taken in from the ambient or outer medium through a duct 3.

The filter 2 removes particles and various bodies having sizes which are greater than about 10μ. The filter is controlled by a pressure regulator 4 connected to its inlet and to its outlet for measuring the loss of pressure which is progressively created by the filtering element. This loss of pressure is indicated by an indicator 5, which shows the saturation state of the filter 2.

The flow of filtered air leaving the filter 2 is taken up by a conduct 6 provided with a regulating valve 7 comprising a progressive drop shutter. The valve 7 is operated by a regulating motor 8 working under the control of an anemometer 9 to which it is connected through conductors 10. After the filter 2, the air circuit comprises a preliminary drier 11 which decreases the temperature of the air to below the dew point, which is itself a function of the temperature of the ambient air. In practice, the preliminary drier 11 brings the temperature of the air to between 2° and 5° C. which removes a great part of the water previously contained in said air in the form of vapor.

The preliminary drier 11 comprises a progressive cooling tunnel 12 for the air. The tunnel 12 consists of a steel tube and is thermally insulated by means of a sleeve 13 made of insulating material. The tunnel 12 comprises in its front part, that is in the upstream part with respect to the flow direction of the air stream, a coil 14 extending transversally in said tube. Through the coil 14 passes a flow of cooling fluid required for the calories which must be removed from the air stream. The tunnel 12 has in its rear part a plurality of deflecting bodies 15 in the form of chevrons or ploughshares directed towards the front. The deflectors 15 extend transversally with respect to said tube and are arranged in quincunx with respect to each other. Each deflector 15 has at least on each of its wings 16 and 17 a series of drilled holes 18 through which passes the air circulating in the tunnel 12 when in operation. Furthermore, the back face of each deflector 15 is concave and collects water and the liquids condensed in the air and conveys them to the bottom, where they pass through apertures 19 in the lower part of the tunnel 12 and fall into a collector 20 having the shape of a truncated cone ending in a conduct 21 and provided with a water level detector 22, such as an electrical resistance.

The refrigeration circuit of the preliminary drier 11 and in particular the coil 14 is traversed by a cooling fluid moved under the influence of a high pressure compressor 23 having a power output which is 25% higher than the power normally required. The circuit comprises in a manner known per se a condensor 24 and a pressure-reducing valve 25 for the cooling fluid, as well as conducts 26 for joining the elements of the circuit.

The motor operating the compressor 23 is controlled by a thermostat 27 in response to the output from a thermal probe 28 transmitted by conductors 29.

The probe 28 is fitted at the outlet of the preliminary drier 11 downstream from the deflectors 15. The cooling fluid traverses the coil 14 countercurrently with respect to the air flow circulating in the tunnel 12.

The water and the other liquids collected in the collector 20 are evacuated through the conduct 21 controlled by an electrovalve 30, the motive element 31 of which is operated by the level indicator 22. The conduct 21 is conveniently provided with a retaining valve 32.

After the preliminary drier 11, the air circuit comprises two identical cooling driers 33 and 34 arranged in parallel. The driers 33 and 34 work alternatingly to decrease the temperature of the air from the dew point to a value between −20° and −40° C.

The driers 33 and 34 are in communication with this preliminary drier 11 through a conduit 35 which separates into two conduits ending respectively in the inlets of said driers.

Each drier 33 or 34 is practically similar to the preliminary drier 11, and comprises a tunnel 36 surrounded by a thermally insulating sleeve 37. The tunnel 36 comprises further at its front part a coil 38 of the refrigeration circuit and at the back part deflectors 39 in the form of ploughshares, holding back the water and the liquids resulting from the condensation of the gases included in the air. The condensed water and liquids are then collected in a collector 40 from which they are evacuated in the same manner as in the preliminary drier 11.

The drier 33 or 34 is provided with electric resistances 41 crossing transversely the tunnel 36 between the elements of the coil 38, and with identical or similar electric resistances 42 arranged below the tunnel 36 and above the collector 40. These electric resistances 41 and 42 are intended to defrost the drier 33 or 34 and to avoid the formation of ice in the vicinity of the apertures 43 of the lower part of the tunnel 36 above the collector 40.

Furthermore each drier 33 or 34 is provided with an inlet drop shutter 44 and with an outlet drop shutter 45 allowing the distribution and the passage of the air flow to be treated, selectively into the drier 33 or into the drier 34. The front drop shutters 44 may consist of a sliding plate 46, moved by parallel endless screws 47 operated by a motive component 48 and transmission pinions 49.

In the same way the rear drop shutters 45 may be formed by a similar plate 50 moved by parallel endless screws 51 operated by a motive component 52 and transmission pinions 53. Each plate 46 or 50 has two circular apertures 54, one of which is in front of the passage of one drier, and the other out of the passage of the other drier and vice versa.

The motive components 48 and 52 operating the drop shutters 44 and 45 thus act in synchronism as a function of the frost formation in the operating drier 33 and 34. Each motive component 48 or 52 is controlled by a servo-motor 55 through conductors 56. A frost detector 57 and a thermal probe 57′ are further arranged on the coil 38 of the drier 33 or 34, providing an electric impulse to a servo-motor 59 through conductors 58 and 58′ when the frost layer reaches a limiting value on said coil 38. The servo-motor 59 then provides a signal to the servo-motor 55 which reverses the circulation of the air flow in the driers 33 or 34 by moving the drop shutters 44 and 45, after having first checked whether the drier to be put in action is in a waiting condition.

Simultaneously the servo-motor 59 provides through the conductors 60 for the electrical power feed of the resistances 41 and 42 to heat the coil 38 of the first drier and to provide for its defrosting. At the end of the defrosting of the frosted drier, the frost detector 57 cuts off the current circulating in the electric resistnces 41 and 43. Immediately after the defrosting the concerned drier is conditioned again to re-establish therein temperature conditions identical to the normal working conditions.

Thus, whenever a drier 33 or 34 must be defrosted, the servo-motors 55 and 59 perform the inversion of the position of the drop shutters 44 and 45, and the feeding of the electric resistances 41 and 43.

Thus, the frosted drier is immediately subjected to defrosting whereas the other drier is immediately crossed by the flow of air to be treated. In this manner the flow of air to be treated is cooled without discontinuity by means of the driers 33 and 34. Furthermore the drier which is then out of operation is immediately after its defrosting subjected to the action of the cooling fluid crossing its coil to re-establish a temperature distribution as in the other, operating drier and to put it in normal working condition.

It must be observed that the coils 38 of the two driers 33 and 34 are preferably integrated in a cooling circuit comprising, in a manner known per se, a compressor 61 and a condenser 62 as well as conduits 63. The compressor 61 is controlled by a thermostat 64 itself conditioned by means of conductors 65 by a thermal probe 66 provided at the outlet of the driers 33 and 34.

Thus the flow of air, filtered and dried at a temperature of −20° to −40° C. at the outlet of the drier 33 or 34, is taken up by a conduit 67 connected to the inlet of the turbine 1. Downstream with respect to the turbine 1 the conduit 69 is provided with a three-way valve 68. Upstream from the turbine 1 a side duct allows the possible introduction of an additional amount of dried air. The speed regulator of the turbine 1 further receives working signals from the above mentioned probe 9.

The side duct of the valve 68 is connected through a conduit 70 to the conduit 6, in a position downstream with respect to the valve 7 and upstream with respect to the preliminary drier 11. The valve 68 therefore possibly allows the recycling of at least a part of the flow of filtered and dried air to the inlet of the preliminary drier 11. This takes place in case of damage to the equipment placed after the turbine 1. The concerned valve 68 is operated by a regulating motor 71 under the control of a thermal probe 72 arranged before the inlet of the turbine 1.

After the valve 68 the air circuit passes through an intensive and dynamic cooling unit which purifies the air in a strong and complete manner.

Substantially, the concerned vertical unit comprises essentially a heat exchanger 73, a separator for liquid 74 and a separator for solid particles 75.

The thermal exchanger 73 is arranged in a cylindrical sleeve 76 between two plates 77 and 78 which are parallel to each other. The exchanger 73 comprises an annular circuit 79 traversed by the air and another tubular circuit 80 traversed by the cooling agent. The annular circuit 79 comprises a plurality of parallel tubes determining the successive zones of passage for the air between the plates 77 and 78. The flow of air is introduced through an inlet 81 provided in the front plate 77 and brings the air in the upper outer passages. From there the air passes in successive passages and approaches the tubular circuit 80. Then the air crosses the central hollow space provided in the bore of the circuit 80 and passes thereafter into the separators 74 and 75.

The air flow is then taken up by a junction 82 having the back plate 78 so as to be directed into the lower and inner passages and to circulate successively through the other lower passages towards the last one, from where it is taken up by an outlet 83 provided in the front plate 77.

The tubular circuit 80 of the cooling agent consists of a spiral groove 84 determined by an outer tube 85 and an inner tube 86 in which it is machined.

The thermal exchange between the air and the cooling fluid or agent takes place progressively in the upper part of circuit 79 and by means of the circuit 80 so as to cool the air by means of said fluid or agent which is brought to a temperature which may decrease to below −212° C. Thus the flow of air which passes through the above mentioned hollow space and which is subjected to the separators 74 and 75, is at a very low temperature bringing about a complete condensation and an appropriate modification of the gaseous or liquid impurities, whether biologic or not, which impurities are removed by said separators 74 and 75.

The thermal exchange between the air and the cooling fluid or agent takes place progressively in the opposite direction, in the lower part of the circuit 79 so as to heat up again the air to a temperature of the same order as the inlet temperature.

It should be observed that the plates 77 and 78 are divided transversally into four parts fed by four inlets 81 connected by a junction 82 and coupled to an outlet 83, the plates 77 and 78 being arranged for that purpose.

The separator for liquids 74 consists essentially of a tubular support 87 bearing on the front plate 77 and surrounded by a metallic cylindrical sleeve 88. A bar 89, on which are slipped successively several deflectors having the shape of a truncated cone 90, the front surface of which is provided with pyramid shaped grooves, extends along the axis of the support 87. The deflectors having the shape of a truncated cone 90 have a plurality of drilled small holes for the passage of the air. Furthermore these deflectors 90, on which the liquid particles are retained, lead the latter towards the tubular support 87 which also has several slits or similar apertures. These liquid particles pass through the slits or apertures of the support 87 and fall by gravity on the bottom of the sleeve 88 to run downwards therefrom.

In this manner the liquid which is thus collected by the sleeve falls by gravity and under the influence of the pressure of the air, to be taken up by a lower collector 101.

The cooling circuit 80 of the cooling fluid operating in the thermal exchanger 73 is integrated in a general circuit further comprising conduits 91, a circulation pump 92 for the cooling fluid and an exchanger 93. The pump 92 is driven by a motor 94 which is controlled by a regulator 95 acting through conductors 96, in response to a thermal probe 97 placed in the passing circuit of the air at the inlet of the liquid separator 74. On the other hand, the thermal probe 97 also controls the operation of a servo-motor 98, which controls the motor 71 of the above-mentioned valve 68 through conductors 99. The exchanger 93 allows the exchange of calories between the cooling fluid circulating in the above-mentioned general circuit and another cooling fluid circulating in a particular cryogenic circuit 100, which acts as an effective cold source. The entirity of the general and particular cooling circuits is able to provide to the air flow a powerful cooling shock which considerably lowers its temperature.

The liquid separator 74 thus separates from the air the liquid particles existing or formed due to the temperature drop of said air. These liquid particles are taken up in a collector 101 from where the liquid is taken off by means of a pump 102 through a conduit 103 provided with a valve 104 operated by a motive component 105 controlled by a level probe 106 placed in said collector 101.

The separator 75 of the solid particles receives the air flow leaving the liquid separator 74.

The separator 75 forms a particular circuit for the passage of the air flow, characterized by successive enlargements creating alternate compressions and expansions of air and consequently continuous changes in the height and direction of the speed of said air during its flow. This results in a precipitation of the solid or solidified particles from the air in the separator 75.

The separator 75 of the solid particles comprises an enclosure 107 and at the front part, an oblong deflecting element which is not as thick at its back end, and two identical deflecting and separating elements 109 having a shape which is substantially the opposite of the previouse one. The identical deflecting and separating elements 109 have a thicker head than the front part of their body so as to show a slight oblong cavity just behind said head. The elements 108 and 109 form acceleration passages through which the treated air is strongly accelerated.

The same applies for the elements 109 and the walls of the enclosure 107 which form with respect to each other further acceleration passages having the same function. In the acceleration passages and owing to the elements 109, there takes place the separation of the larger solidified particles.

At its back part, the separator 75 comprises on the one hand, three identical deflecting and separating elements 110, also oblong and narrowing to the back end, and on the other hand, two deflecting elements 111, located between the former, and pointed to the front end. The deflecting and separating elements 110 form with respect to each other and with the deflecting elements 111 acceleration passages having a similar function as the previous ones. The same deflecting and separating elements 110 form also with respect to the enclosure 107 other equivalent acceleration passages. It should be observed that the elements 110 have an elongated tail which is flatter than that of the elements 109.

Owing to the elements 110 there takes plase a separation of the small and fine solid or solidified particles. On the other hand, the elements 111 are mainly used to avoid the rough projection of the air jets at the outlet of the separator 75.

In the middle the separator 75 shows an undulator 112 formed by a succession of bulgings and receiving the air coming out between the elements 108 and 109 and the enclosure 107. The undulator 112 injects a high speed flow of air into the back part of the separator.

The elements 108 to 111 form with respect to each other acceleration slits and nozzles, for the accelerated passage of the air. Furthermore the elements 109 and 110, which show lateral slits and inner holes, thereby perform the removal of the solid or solidified particles under the influence of the suction created in said slits and said holes by an aspiration means which is external to the separator 75.

The second embodiment of the installation differs from the first one by the separator of solid particles 75', which this time may operate without a thermal exchanger being arranged upstream and downstream of it.

The separator 75' of the solid particles comprises two vertical walls which are not represented and which support two opposite walls 154 and 155. These walls 154 and 155 extend horizontally as a whole, and have inner holes such as 156 and narrow slits 157 connected to channels 158 in which a suction effect may be exerted. The walls 154 and 155 form with respect to each other an inlet 159 and an opposite outlet 160.

At the inlet 159, having the shape of a truncated cone, the separator 75' comprises a deflecting element 161 having the shape of a dihedron in the front side. The front faces of the deflecting element 161 and those of the inlet 159 draw towards each other to the inside of the separator 75'. The back faces of the deflecting element 161 are also curved inwardly and converging with respect to each other.

At the back of the deflecting element 161, the separator 75' comprises two transversally aligned deflecting and separating elements 162. Both deflecting elements 162 form with respect to each other and with respect to the walls 154 and 155 two acceleration passages 163.

The deflecting and separating elements 162 are similar to the elements 110 of the first embodiment. Each deflecting element 162 has narrow slits 164 on both faces of its tail and at the extremity of said tail. The slits 164 are in communication with an inner and flat longitudinal channel, emerging in a more important transverse cylindrical collector in which there may be produced a suction effect.

In fact, each deflecting and separating element 162 has a transverse-section which is comparable to that of a falling drop, the tail of which extends to the back in the case of the separator 75'.

Behind the two deflecting and separating elements 162 are three other similar elements 167, which are aligned transversally. The deflecting and separating elements 167 also form with respect to each other and with the walls 154 and 155 acceleration passages 168. The elements 167 are positioned in quincunx with respect to the above mentioned elements 162.

Behind the deflecting and separating elements 167 are arranged two similar elements 169, again transversally aligned. The deflecting and separating elements 169 determine with respect to each other and with respect to the walls 154 and 155 acceleration passages 170. The elements 169 are aligned horizontally in accordance with the abovementioned elements 162.

Behind the deflecting and separating elements 169 is a transverse line of similar elements 171, also forming with respect to each other and with respect to the walls 154 and 155 further acceleration passages 172.

Finally, near the substantially rectangular outlet 160, the separator 75' comprises three fixed elements 173, 174 and 175, two of which (173 and 175) extend longitudinally between the tails of the elements 171 and of which the third (174) is placed transversally behind the tail of the middle element 171.

The entirety of the components of the separator 75' is not limited to the specific number of separating and deflecting elements mentioned herabove.

Furthermore, the spaces 176 which exist between the tails of the elements 162, 167, 169 and 171 constitute in fact expansion rooms for the air. In these rooms the air stream is divided into several jets, propelled at different speeds.

In order to achieve the efficiency of the accelerating passages between the elements 162, 167, 169 and 171, the back tip of the deflecting element 161 extends to between the heads of the elements 162, whereas the tails of the elements of a transverse series extend on their side to between the heads of the elements of the following series.

Figure 21:
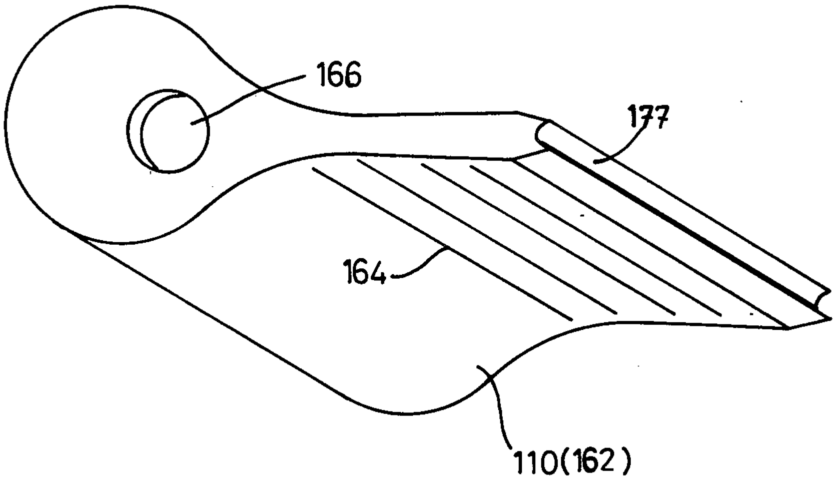
FIG. 21 is a view in perspective of a deflecting element of the separator for solid particles of the cooling unit.
Figure 22:
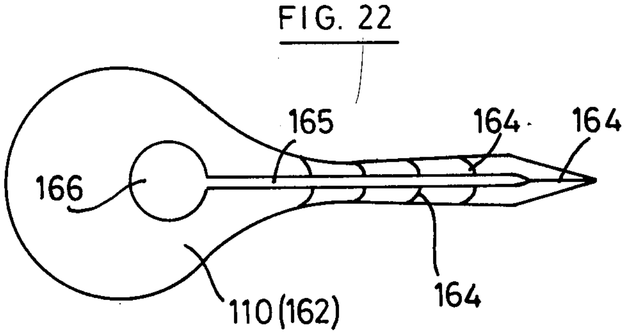
FIG. 22 is a side view of said deflecting element.
Figure 23:
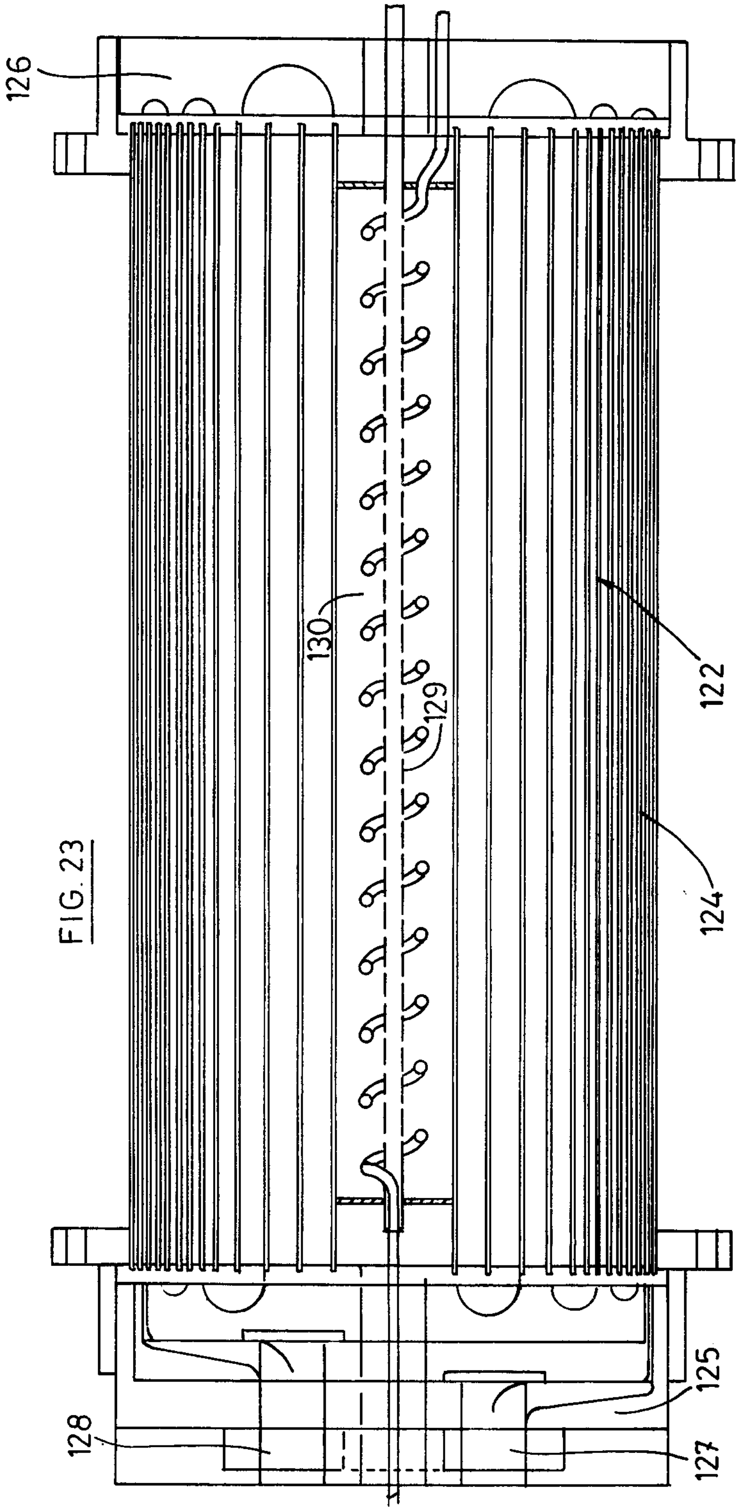
FIG. 23 is an axial section of the cooling unit.
Figure 24:
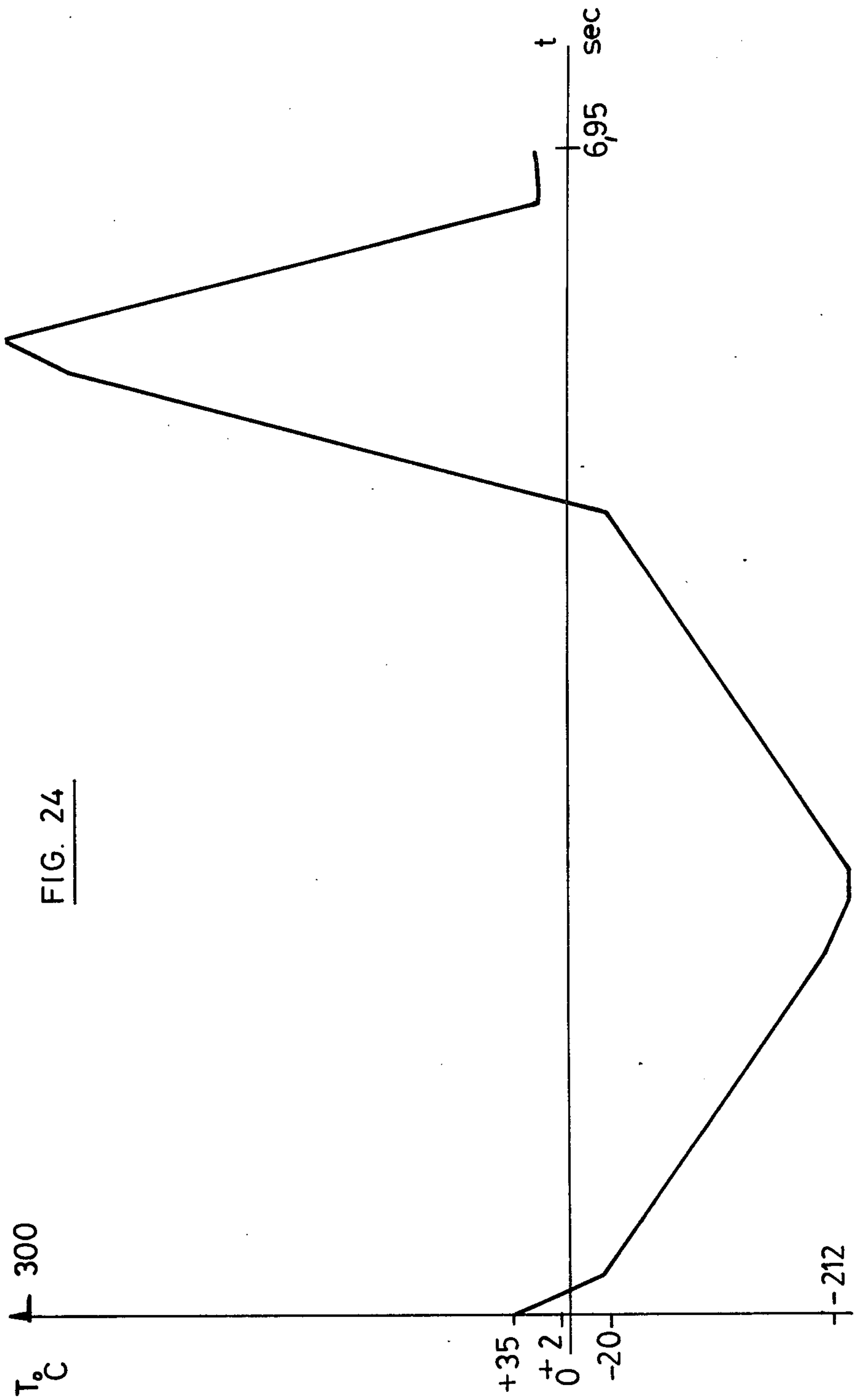
FIG. 24 is a diagram of the temperatures of the air along its circuit through the apparatus.
Figure 25:
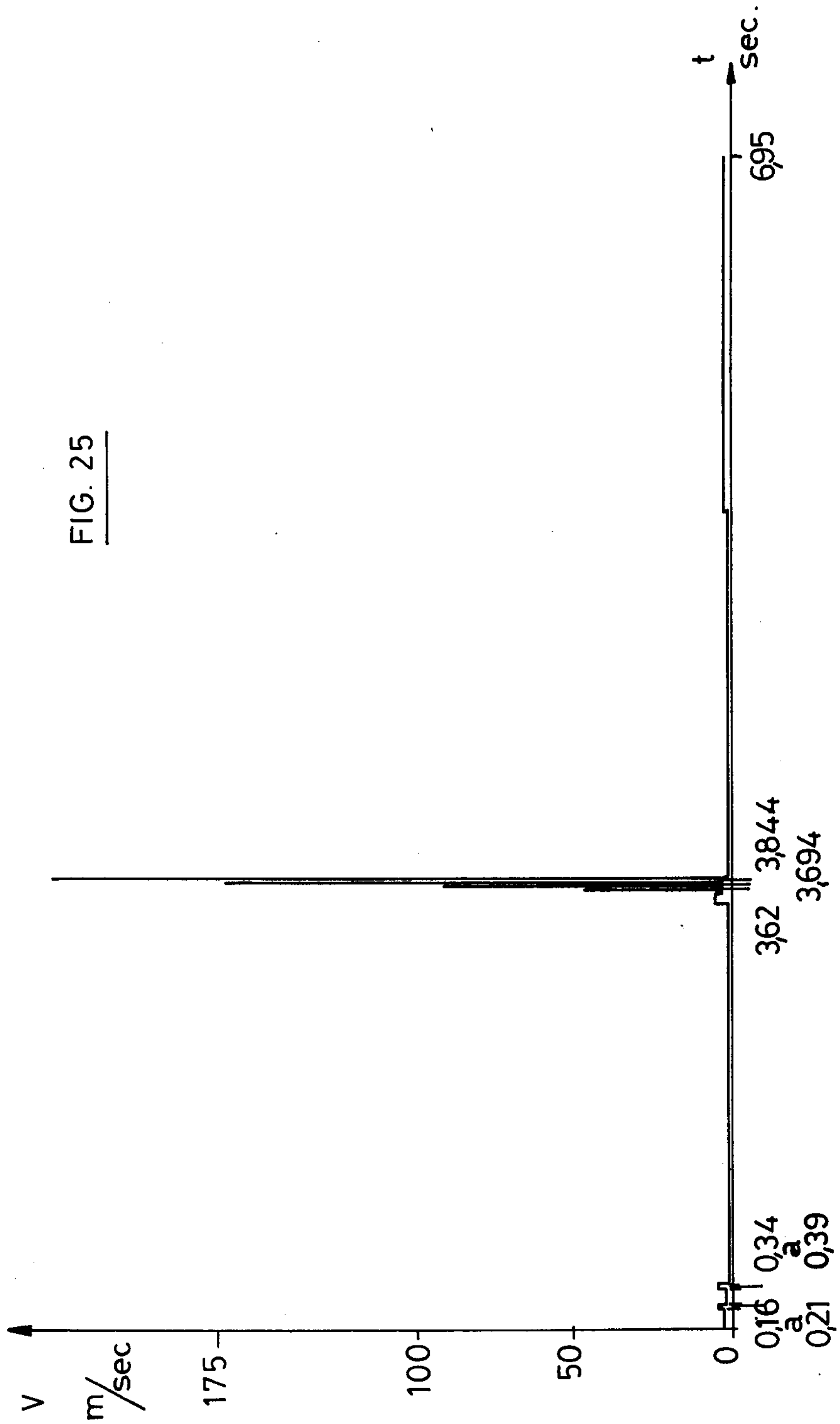
FIG. 25 is a diagram of the speeds of the air along its circuit through the apparatus.
Figure 26:
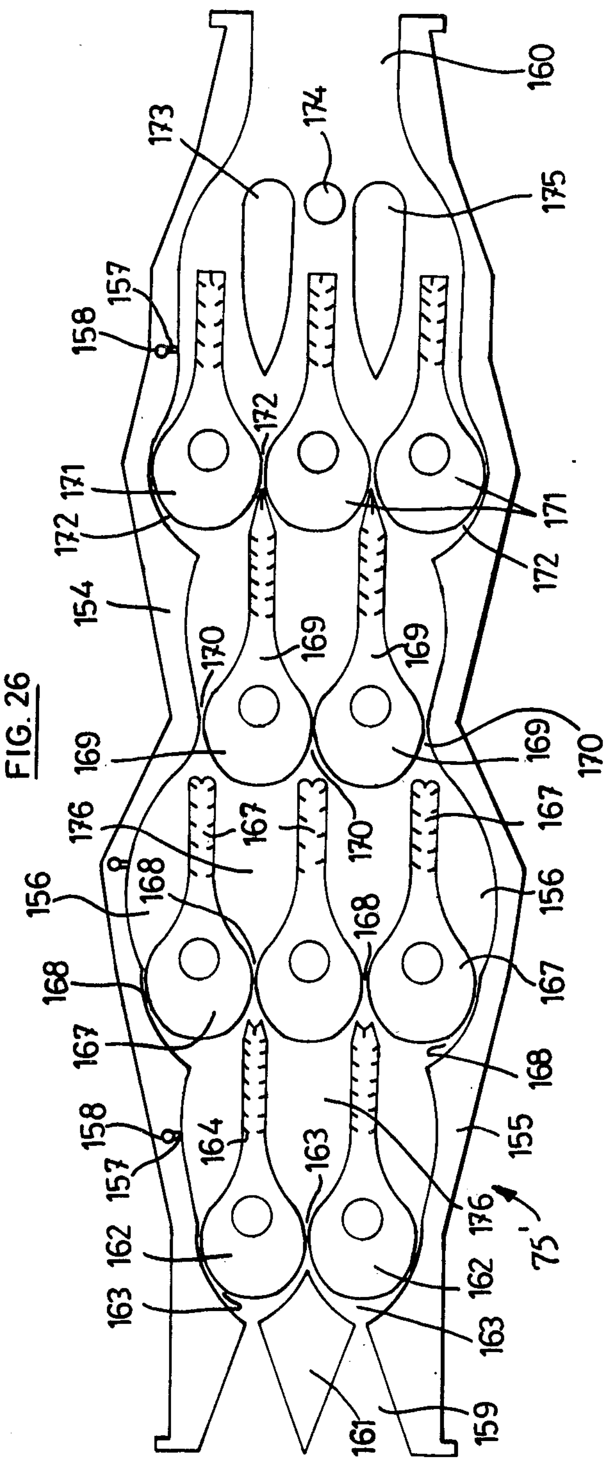
FIG. 26 shows a second embodiment of a separator for solid particles.
Figure 28:
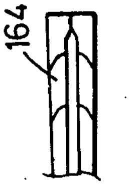
FIGS. 27 and 28 illustrate two other embodiments of deflecting and separating elements of the second separator for solid particles.
Figure 27:
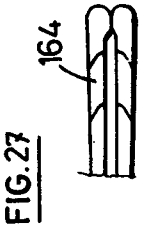

In the second embodiment of the separator 75' for the solid particles, the deflecting and separating elements are distinguished from each other by the shape of the extremity of their tail. Thus the first elements 162 have a funnel or V-shaped tail as shown in FIG. 21, whereby the extremity of the tail has over its total width a groove 177 in which ends the extreme slit 164. The second elements 167 have also a funnel shaped extremity on their tails, whereby the flanks of the widening out part are rounded as shown in FIG. 27. The extreme slit 164 emerges also in the bottom of said widening out part. Furthermore, the third elements 169 have a sharp pointed extremity on their tail. The extreme slit 164 emerges in this case along the rim of the considered point. The fourth elements have further the extremity of their tail which is perpendicular to the direction of said tail, whereby the extreme slit emerges in the middle of said extremity.

In the case of the separator 75' for the solid particles, the means for creating the suction effects referred to hereabove create a depression which is greater than at least 1 millibar in said elements.

The third embodiment of the device differs from the first one by the separator 75" for the solid particles.

The separator 75" for the solid particles comprises essentially an annular wall 178 extending along a horizontal axis. The annular wall 178 comprises a front part 179 and a back part 180 which are screwed with respect to each other and which are maintained in their relative position by means of pins 181.

The back part 180 of the wall 178 has a suction slit 182, whereas it forms towards the front side another suction slit 183 with the front part 179. Both suction slits 182 and 183 are in communication with an inner channel 184 emerging in an inner collector 185, connected through a junction 186 to a device which is able to create a suction effect.

Figure 29:
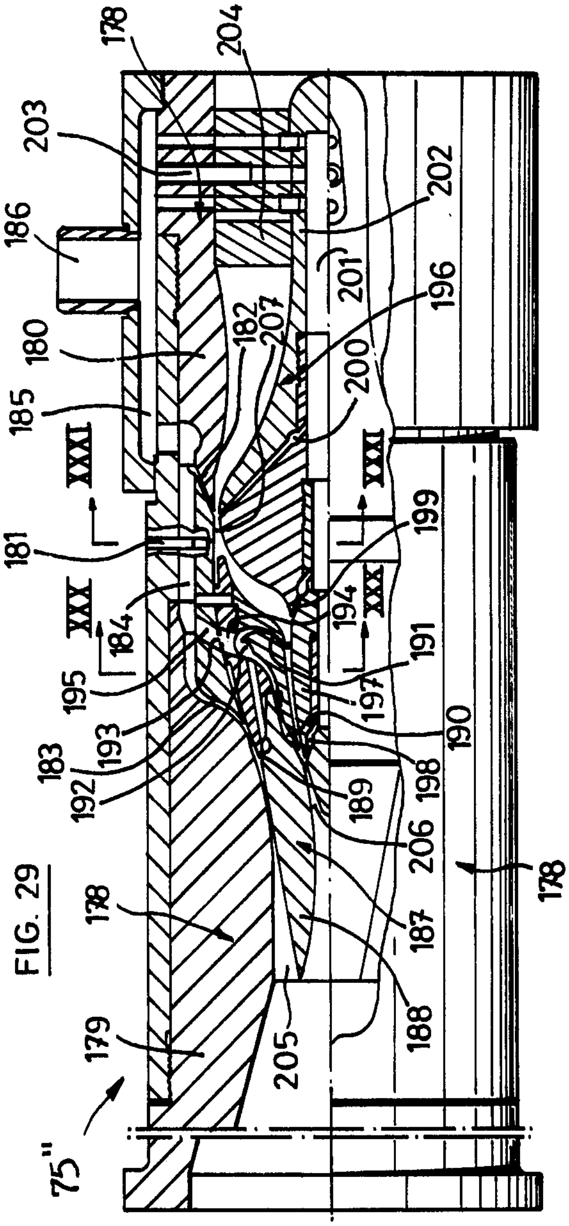
FIG. 29 is an axial section of a third embodiment of the separator for solid particles.
Figure 30:
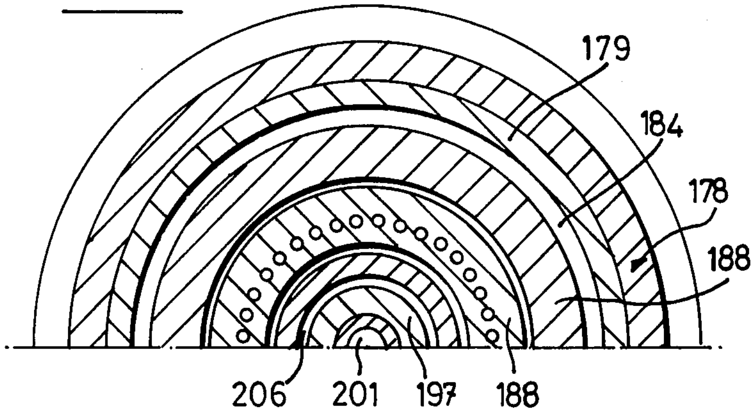
FIG. 30 is a transverse section of the third separator for solid particles, made according to line XXX—XXX of FIG. 29.
Figure 31:
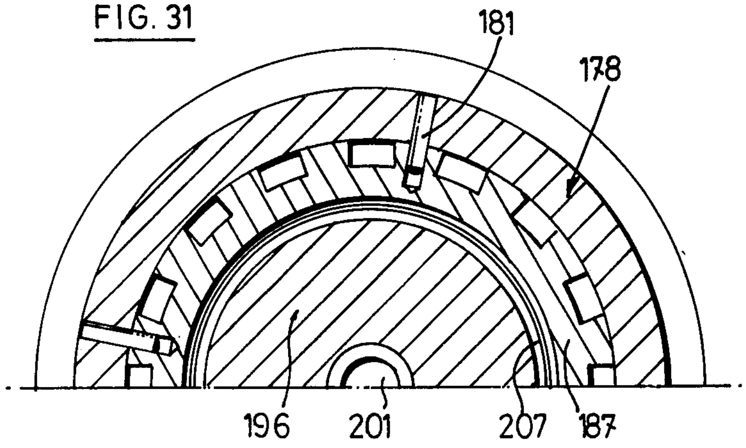
FIG. 31 is a similar transverse section made according to line XXXI—XXXI of FIG. 29.

In the wall 178, the separator 75" for solid particles comprises an annular deflector 187 of which the front part 188 is tapering as shown in FIG. 29.

The front extremity of part 188 constitutes in fact a sharp rim. The deflector 187 separates the flow of air crossing the inlet of the separator 75" into two substantially equal partial flows.

The deflector 187 has three suction slits 189, 190 and 191. The two first slits 189 and 190 are aligned practically according to one transverse plane, whereas the third slit 191 is arranged behind said plane. The three slits 189, 190 and 191 are in communication with an inner channel 192, which is connected to said inner collector 184 by a passage 193 provided between the deflector 187 and the wall 178, and being in communication respectively with inner conducts 194 and 195 of said deflector 187 and of said wall 178.

At the back part of the deflector 187, the separator 75" comprises another axial deflector 196 the front part 197 of which is introduced in the cavity of the first deflector 187.

The second axial deflector 196 comprises three annular suction slits 198, 199 and 200, which are arranged in succession towards the back end. The three suction slits 198, 199 and 200 emerge in a common central collector 201 which extends as far as the back part 202 of said deflector 196. The collector 201 of the deflector 196 is in communication with the collector 185 of the wall 178 through the conducts 203, formed transversally in the back part 202, in said wall 178 and in an intercallation cross 204, as shown in FIG. 29.

The first deflector 187 inside the wall 178 determines with said wall 178 a first acceleration passage 205. On the other hand the second deflector 196 determines with the inner face of the first deflector 187 a second acceleration passage 206. Furthermore the second deflector 196 forms also with the wall 178 a third acceleration passage 207, located behind the two preceding ones. In the third example, the suction slits referred to hereabove are located in the acceleration passages.

The separation of the solid or solidified particles contained in the air results mainly from modifications of the velocity and the pressure, in particular at each side of the acceleration passages, whereas the recovery of said separated particles results from their aspiration in particular through the suction slits.

It should be observed that the separator 75" is able to operate without the preliminary thermal exchanger directly on the crude air.

At the outlet of the separator 75, 75' or 75", the solid particles which are removed from the air flow are taken up and extracted by means of a small extraction turbine 113 operated by a motor 114 which is controlled by the above mentioned servo-motor 98.

The thermal exchanger 75 comprises an inlet drop shutter 115 and an outlet drop shutter 116 identical or similar to the drop shutters 44 and 45. The drop shutters 115 and 116 are operated by motive components 117 and 118, which are also controlled by the servo-motor 98.

The upper and lower parts of the exchanger 73 are provided with respective pressure regulators 119 and 120 for letting in supplementary amounts of filtered and dried air, in case of necessity.

It should be observed that the liquids and solids removed by the separators 74 and 75, 75' or 75" are sent to a treatment enclosure 121 in which they may be converted and possibly recovered.

The air circuit further comprises after the thermal exchanger 73, a particular reheater 122. The outlet of the exchanger 73 is connected by a conduct 123 to the inlet of said reheater 122.

In substance the reheater 122 comprises an annular heat exchanger placed in a cylindrical collar 124 maintained between two plates 125 and 126. The heat exchanger consists of several different tubes which determine passages for the air flow, and which become wider and wider as one goes further away from the collar 124 towards the axis in any radial direction.

The air flow to be reheated enters in a slightly eccentric inlet 127. The air flow passes first in the outer passage of one of the parts of the heat exchanger, then in the ever widening passages to the inner passage of said part and then in the widest upper passage of the other part of the exchanger, then in the ever narrowing passages and finally in the narrowest passage of said other part from where the air flow is taken up by an outlet 128 which is also eccentric.

In order to obtain the required heat to reheat the air flow, the reheater 122 comprises a gas tube 129 extending axially and having a series of lateral holes for the passage of the combustion gas which is burned by a combustive air stream, which is admitted through an admission pipe 130, whereby the burned gases are extracted through an exhaust pipe. The heat exchanger of the reheater 122 is also provided with two drop shutters, one for the inlet 131 and the other for the outlet 132, identical or similar to the previous ones and operated and controlled by similar means. It is thus provided to operate the drop shutters 131 and 132 with a motive component 133 controlled by a servo-motor 134, which is influenced by a thermal probe 135 placed on the path of the air flow at the outlet of the reheater 122. Pressure regulators 136 are also provided on the heat exchanger of the preheater 122 to allow the release to a chimney of the amount of air in excess in said exchanger during its normal working condition.

It should be observed that the feed conduit 137 to the burner or the gas tube 129 is provided with an electrovalve 138 which is controlled by a regulator 139, which is itself conditioned by a temperature probe 140, placed in the ambient medium.

Owing to its passage through the preheater 122, the air flow is heated abruptly to temperatures between 250° and 450° C. and cooled abruptly to the ambient temperature.

In the case of medical applications of the present apparatus, the liquids and solids which are removed from the air to be treated may also be incinerated in the heat source of the intensive heating unit, in particular in the combustion chamber formed by the pipe 130.

At the outlet of the preheater 122, the air circuit comprises a moistening unit 141 to reinject a predetermined amount of distilled and demineralized water into the already treated air flow. The moistening unit 141 is connected to the reheater 122 by means of a conduit 142, and consists of an enclosure 143 comprising an inlet pipe 144 which is fed by a source of distilled and demineralized water which may originate from the recovery of the waters extracted by the preliminary dryer 11 and the dryers 33 and 34 and previously demineralized and distilled at high temperature in the coil of the heat exchanger 122. The flow of distilled water passing through the conduit 144 is regulated by means of a valve 145 which is operated by a motive component 146 controlled by an hydrometrical probe 147 placed at the end of the air circuit.

The circuit of the thus completely purified air ends in a conduit 148 provided with a three way electrovalve 149, operated by a motive component 150 which is itself controlled both by the anemometer 9 and the probe 147.

One of the openings of the electrovalve 149 is connected to a conduct 151 attached to a using device 152 of the purified air, whereas another one of the openings of said electrovalve 149 is connected to a by pass conduct 153 which may lead back at least a part of the purified air into the conduit 69 emerging from the valve 68 positioned between the turbine 1 and the intensive cooling unit 73, 74, 75.

All the control, regulation and survey operations in the apparatus are advantageously performed by means of an electronic microprocessor.

The applications of the apparatus described hereabove are several and relate mainly to the medical and hospital field, however not excluding the laboratory and industrial fields as well as the fields of air treatment in general. Among these applications are supplying air for respiration or sterile air containing a specific agent into an enclosure, which allows precise indications with respect to allergies. Further one may carry out tests with specific atmospheres in asthmatology or in immunology. Other applications consist in creating a precise ambient medium in an enclosure in order to practice therein a climatotherapic treatment or to lighten the burden on a patient suffering from a serious illness.

Another application consists in creating white rooms which are enclosures for absolutely sterile preparations. Incubators for new born children may also be used with the new apparatus, which may also be used to further improve the environment of organs to be transplanted, in the enclosures for their conservation. Applications for the new apparatus are further also possible for treatments in which the air in an enclosure must be modified for the treatment of heavily burned patients.

Another application of the apparatus according to the invention is the feeding of pure air in surgical operating rooms.

The new apparatus according to the invention also allows the extraction and possibly the recovery of organic gases or inorganic products generated by industrial equipment. The recovered gases may in certain cases be stocked and used again in the manufacture of industrial products.

The apparatus according to the invention may thus be used for extracting and recovering the carbon sulfide contained in the fumes of factories for the manufacture of viscose.

The apparatus according to the invention may also be used to purify and condition the air used for the ventilation and the heating or cooling of the premises of large buildings.

The efficiency of the new apparatus described hereabove has been shown and checked by various tests. In a first series of tests there has been applied a sporulating culture of Penicilium brevi compactum on Sabourand medium, in Petri boxes, before the inlet of the apparatus. The spores were partially aspirated into the air circuit of the apparatus. A sterile Petri box with Sabouraud medium was positioned for 30 minutes at the outlet of the apparatus and was incubated for three weeks at ambient temperature. No growth of micro organisms was detected.

A second series of tests treated a flow of air containing ammoniac. At the inlet of the apparatus the ammoniac concentrations were 561.4 ppm, and 1315.8 ppm, whereas at the outlet of the apparatus said concentration had dropped to 8 ppm and 20 ppm, respectively. In this manner the percentage of ammoniac removed by the apparatus was 98.6% in the first case and 98.5% in the second case.

A third series of tests treated an air flow containing acetone and vapours of hydrochloric acid. At the inlet of the apparatus the acetone concentration was 7000 ppm and the hydrochloric acid concentration was 60 ppm. At the outlet of the apparatus the acetone concentration had dropped to 60 ppm and that of the hydrochloric acid was zero. The percentage of acetone removed by the apparatus was therefore of 99.33% whereas the percentage of removed hydrochloric acid was of 100%.

It should be clear that the invention is not exclusively limited to the represented embodiment and that numerous modifications can be brought to the shape, the arrangement and the constitution of certain elements encountered in connection with its carrying into effect, provided that said modifications are not in contradiction with the subject matter of any of the following claims.

What I claim is:

1. Apparatus for neutralizing and purifying air, comprising, in succession:

(a) rotary air filter means for removing particles from the air to be treated, said rotary filter means having an inlet for receiving air to be treated and an outlet, (b) a preliminary drier means comprising a cooling tunnel having an inlet connected to the outlet of said rotary air filter means to receive air filtered by said rotary air filter means and through which the filtered air passes to an outlet of said preliminary drier means and including a refrigeration coil followed by a plurality of deflectors for partially removing liquid particles and droplets in the air formed by its cooling to their dew point, (c) two further drier means connected to said outlet of said preliminary drier means to receive air from the preliminary drier means and which are alternately operable, each having a cooling tunnel through which the predried air passes and comprising a cooling coil for cooling the air to a temperature of from −20° to −40° C. followed in the direction of air flow by a plurality of deflectors for completely removing any liquid droplets and particles remaining in the air or formed during its cooling, each further drier means being provided with a defrosting system, (d) means for providing a cooling medium to the cooling coils of said further drier means, (e) a turbine connected to an outlet of said two further drier means for moving the air to be treated through the apparatus, and (f) a cooling unit means connected to an outlet of said turbine for receiving the dried air from the further drier means and comprising, in order in the direction of air flow, heat exchanger means cooperating with refrigeration machine means to cool the dried air, separator means for separating droplets and particles of liquefied gas formed during the cooling of the dry air, separator means for separating solid particles existing or formed during the same cooling of said dry air, and further heat exchanger means for reheating the dry and treated air to the inlet temperature of the first recited heat exchanger means.

2. Apparatus according to claim 1, in which the filter means has a pressure regulator means connected to the inlet and outlet of the filter means for controlling its loss of pressure.

3. Apparatus according to claim 1 further comprising a thermostat and a thermal probe electrically coupled to said thermostat, said thermal probe being disposed in the outlet of said preliminary drier means, said preliminary drier means being controlled by said thermostat which operates in response to the thermal probe.

4. Apparatus according to claim 1, in which each of said drier means comprises inlet and outlet drop shutters connected to and operated synchronously by a motive component which is coupled to and controlled by a servo-motor connected to said two further drier means.

5. Apparatus according to claim 4, wherein each of said drier means further comprises a frost detector, a servo-motor and electrical resistances, said frost detector being positioned to sense frost on said cooling coils, said frost detector being operatively coupled to said servo-motor, said servo-motor operating in response to said frost detector to supply current to said electrical resistances to heat said electrical resistances so as to defrost said cooling coils.

6. Apparatus according to claim 1, in which the preliminary drier means and each further drier means further comprise a collector for water removed from the air.

7. Apparatus according to claim 1, wherein the turbine further comprises a speed regulator.

8. Apparatus according to claim 1, wherein the heat exchanger means of the cooling unit further comprise inlet and outlet drop shutters which are coupled to and operated synchronously by a motive component connected to and controlled by a regulator which is coupled to and operates in response to a thermal probe disposed upstream of the turbine and a thermal probe disposed inside said cooling unit.

9. Apparatus according to claim 8, in which the heat exchanger means of the cooling unit are arranged to form an annular central cavity in which the separator means for the liquid particles and the separator means for the solid particles are axially disposed.

10. Apparatus according to claim 9, in which the refrigeration machine means of the intensive cooling unit is coupled to and controlled by said thermal probe disposed inside said cooling unit.

11. Apparatus according to claim 10, in which the separator means for liquid particles comprises a perforated tubular support surrounded by an outer sleeve and containing deflectors having the shape of a truncated cone and provided with a plurality of small holes for the passage of the air, said deflectors channeling the retained liquid particles towards the support where they pass through apertures in said support and collect in said outer sleeve.

12. Apparatus according to claim 11, in which the separator means for solid particles comprises an enclosure having a first series of oblong deflecting and separating elements each having a variable thickness and forming with respect to each other and with respect to the longitudinal walls of the enclosure, acceleration passages for air jets, said oblong elements having aspiration slits for the solid particles which are in communication with an inner hole.

13. Apparatus according to claim 12, in which the oblong deflecting and separating elements each have a teardrop shape and are oriented longitudinally with respect to the enclosure.

14. Apparatus according to claim 13 wherein the separator means for the solid particles comprises:

a first oblong deflecting element positioned at a front part of said separator means, said deflecting element narrowing towards the rear of said separator means;

second and third oblong deflecting elements, positioned at said front part of said separator means, said second and third oblong deflecting elements narrowing towards the front of said separator means, a narrower portion of said first oblong deflecting element being positioned between wider portions of said second and third oblong deflecting elements;

an undulator having successive bulgings, said undulator being positioned in a middle part of said separator means; and a plurality of fourth oblong deflecting elements, said fourth oblong deflecting elements being positioned at a rear part of said separator means and said fourth oblong deflecting elements being arranged transversely in said rear part of said separator means, each of said fourth oblong deflecting elements narrowing towards said rear part of said separator means.

15. Apparatus according to claim 13, wherein said separator means for said solid particles comprises five oblong deflecting elements, three of said oblong separating elements narrowing towards the rear of said separator means and two of said oblong separating elements narrowing towards the front of said separator means, narrower portions of said two oblong separating elements being positioned between wider portions of said three oblong separating elements.

16. Apparatus according to claim 13, in which the separator means for solid particles comprises a single pair of annular deflecting separating elements positioned in an positioned in a cavity formed by a longitudinal wall of said separator means, one of said elements tapering towards the front end of said enclosure and the two elements of said single pair forming with respect to each other and with respect to the longitudinal wall acceleration passages in which the aspiration slits provided in said elements emerge.

17. Apparatus according to claim 1, further comprising:

heating unit means, said heating unit means having an inlet coupled to an outlet of said cooling unit means for receiving dry air leaving said cooling unit means, said heating unit means comprising first and second heat exchangers and a heat source, said first heat exchanger receiving heat from said heat source for quickly heating the dry air to a temperature between 250° C. and 450° C., and said second heat exchanger having an inlet coupled to an outlet of said first heat exchanger for receiving air from said first heat exchanger, said second heat exchanger quickly cooling air received from said first heat exchanger.

18. Apparatus according to claim 17, further comprising a moistening unit having an inlet coupled to an outlet of said heating unit means for receiving the dry air leaving the heating unit means and comprising means for injecting distilled and demineralized water.

19. Apparatus according to claim 18, further comprising at least one conditioner for receiving the moistened air and comprising means for injecting at least one additive.

20. Apparatus according to claim 17, in which said heat exchangers of the heating unit means have an annular shape and have a central hole in which said heat source is disposed.

21. Apparatus according to claim 20, in which the heat exchangers of said heating unit means are positioned on both sides of the heat source, one of said heat exchangers having a duct for the passage of air, said duct increasing in size from the outside portion of said heat exchanger towards its center longitudinal axis and the other heat exchanger having a duct which decreases in size from the outside portion of said heat exchanger towards its center longitudinal axis.

* * * * *